US009218762B2

(12) United States Patent
Rabii

(10) Patent No.: US 9,218,762 B2
(45) Date of Patent: Dec. 22, 2015

(54) DIMMING TECHNIQUES FOR EMISSIVE DISPLAYS

(75) Inventor: Khosro M. Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1223 days.

(21) Appl. No.: 12/873,963

(22) Filed: Sep. 1, 2010

(65) Prior Publication Data

US 2012/0050338 A1 Mar. 1, 2012

(51) Int. Cl.

| | |
|---|---|
| ***G09G 5/10*** | (2006.01) |
| ***G09G 5/00*** | (2006.01) |
| ***G09G 3/36*** | (2006.01) |
| ***G09G 3/30*** | (2006.01) |
| ***G09G 3/28*** | (2013.01) |
| ***G06K 9/40*** | (2006.01) |
| ***H04N 5/57*** | (2006.01) |
| ***G09G 3/32*** | (2006.01) |
| *G09G 3/22* | (2006.01) |

(52) U.S. Cl.

CPC ................ *G09G 3/3208* (2013.01); *G09G 3/22* (2013.01); *G09G 2320/0271* (2013.01); *G09G 2320/0626* (2013.01); *G09G 2320/10* (2013.01); *G09G 2330/021* (2013.01); *G09G 2340/16* (2013.01)

(58) Field of Classification Search

CPC .......... G09G 2330/021; G09G 3/3406; G09G 3/3666; G09G 2340/16; G09G 2320/0285; G09G 2320/062; G09G 2320/066; G09G 2320/103; G09G 2320/0613; G09G 2320/0653; G09G 2330/022; G09G 2360/16

USPC .................. 345/690, 102; 383/266, 274, 275

See application file for complete search history.

(56) References Cited

U.S. PATENT DOCUMENTS

| | | | | |
|---|---|---|---|---|
| 5,598,565 | A | 1/1997 | Reinhardt | |
| 5,860,016 | A | 1/1999 | Nookala et al. | |
| 6,333,745 | B1 | 12/2001 | Shimomura et al. | |
| 6,642,910 | B2 | 11/2003 | Takada et al. | |
| 6,992,675 | B2 | 1/2006 | Aleksic et al. | |
| 7,460,136 | B2 | 12/2008 | Jeffrey et al. | |
| 7,734,943 | B2 | 6/2010 | Whelan et al. | |
| 2002/0149607 | A1 | 10/2002 | Ito | |
| 2002/0163523 | A1 | 11/2002 | Adachi et al. | |
| 2003/0080967 | A1 * | 5/2003 | Milch et al. | 345/589 |

(Continued)

FOREIGN PATENT DOCUMENTS

| | | | |
|---|---|---|---|
| CN | 1394437 | A | 1/2003 |
| CN | 200983002 | Y | 11/2007 |

(Continued)

OTHER PUBLICATIONS

International Search Report and Written Opinion—PCT/US2011/050074, ISA/EPO—Oct. 25, 2011.

(Continued)

*Primary Examiner* — Nalini Mummalaneni

(57) ABSTRACT

This describes power saving techniques for emissive displays. In one example, the outputs of emissive elements in an emissive display are selectively reduced in order to save power when the emissive display does not change its output imagery for a defined period. The techniques of this disclosure may achieve effects in emissive displays that appear visually similar to, or better than, the effects in conventional transmissive displays when the backlight dims over time.

42 Claims, 9 Drawing Sheets

(56) References Cited

U.S. PATENT DOCUMENTS

| | | | | |
|---|---|---|---|---|
| 2006/0012714 | A1 | 1/2006 | Louie et al. | |
| 2007/0046684 | A1 | 3/2007 | Jeffrey et al. | |
| 2007/0115213 | A1 | 5/2007 | Hsu et al. | |
| 2007/0239913 | A1 | 10/2007 | Knepper et al. | |
| 2008/0116827 | A1* | 5/2008 | Williams | 315/360 |
| 2008/0143695 | A1 | 6/2008 | Juenemann et al. | |
| 2008/0204378 | A1 | 8/2008 | Park et al. | |
| 2009/0251477 | A1 | 10/2009 | Su et al. | |
| 2010/0007599 | A1* | 1/2010 | Kerofsky | 345/102 |
| 2010/0085386 | A1* | 4/2010 | Lin et al. | 345/690 |
| 2010/0123648 | A1* | 5/2010 | Miller et al. | 345/76 |
| 2011/0080419 | A1 | 4/2011 | Croxford et al. | |
| 2011/0216084 | A1 | 9/2011 | Mori et al. | |
| 2011/0285682 | A1 | 11/2011 | Kwan et al. | |
| 2011/0298818 | A1 | 12/2011 | Mori et al. | |
| 2012/0056911 | A1* | 3/2012 | Safaee-Rad et al. | 345/690 |
| 2013/0016114 | A1 | 1/2013 | Rabii | |

FOREIGN PATENT DOCUMENTS

| | | | |
|---|---|---|---|
| JP | 2000187469 | A | 7/2000 |
| JP | 2001022337 | A | 1/2001 |
| JP | 2002262273 | A | 9/2002 |
| JP | 2002318577 | A | 10/2002 |
| JP | 2003058114 | A | 2/2003 |
| JP | 2006120145 | A | 5/2006 |
| JP | 2007043218 | A | 2/2007 |
| JP | 2009211494 | A | 9/2009 |
| JP | 2010026219 | A | 2/2010 |
| JP | 2010139782 | A | 6/2010 |
| JP | 2010139783 | A | 6/2010 |
| TW | 575856 | B | 2/2004 |
| WO | 2006103629 | A1 | 10/2006 |
| WO | WO 2010083740 | A1 * | 7/2010 |

OTHER PUBLICATIONS

Luo, "Designing Energy and User Efficient Interactions with Mobile Systems," School of Computer Science, Carnegie Mellon University, 2008, pp. i-xii and 1-107.

Cheng W.C., et al., "Power Minimization in a Backlit TFT-LCD Display by Concurrent Brightness and Contrast Scaling", Consumer Electronics, IEEE Transactions on, vol. 50, Issue-1,2004, pp. 25-32.

* cited by examiner

DIMMING TECHNIQUES FOR EMISSIVE DISPLAYS

TECHNICAL FIELD

The disclosure relates to emissive displays, such as organic light emitting diode (OLED) displays, and more particularly, to power saving techniques for emissive displays.

BACKGROUND

Transmissive displays are displays that generally include a backlight. In transmissive displays, light is emitted from the backlight and transmitted through various layers or films, which manipulate the light in order to generate the desired rendition on the transmissive display. Liquid crystal displays (LCDs) are common examples of transmissive displays used in a wide range of display technologies. In particular, LCDs are very common in handheld devices, such as calculators, handheld computers, cellular telephones, smart phones, personal digital assistants (PDAs), digital cameras, hand-held gaming devices, laptop computers, and other devices. LCDs are also used in larger display systems, such as televisions and large computer displays. In devices that include transmissive displays, such as LCDs, the backlight can be dimmed or turned off in order to save power in the device.

Emissive displays, such as plasma displays and organic light emitting diode (OLED) displays, are emerging as viable alternatives to transmissive displays. Emissive displays do not generally include a backlight. Instead, emissive displays include an array of emissive elements that are individually controlled to generate the desired rendition on the display. The emissive elements of emissive displays are generally analogous to individual light sources. Each pixel of an emissive display may be generated by controlling the output of one or more emissive elements of the emissive display.

SUMMARY

This disclosure describes power saving techniques for emissive displays. In accordance with this disclosure, the output intensities of emissive elements in an emissive display are reduced in order to save power when the emissive display does not change its output imagery for a defined period. The techniques of this disclosure may achieve visual effects in emissive displays that are visually similar to, or possibly better than, the effects in conventional transmissive displays when the backlight dims over time.

In one example, this disclosure describes a method comprising detecting a static mode in an emissive display, mapping input signals to adjusted signals for a plurality of emissive elements of the emissive display based on magnitudes of the input signals, and applying the adjusted signals to selectively dim output of the plurality of emissive elements, in response to detecting the static mode.

In another example, this disclosure describes an apparatus comprising an emissive display including a plurality of emissive elements, and a dimming unit that detects a static mode in the emissive display, maps input signals to adjusted signals for the plurality of emissive elements of the emissive display based on magnitudes of the input signals, and applies the adjusted signals to selectively dim output of the plurality of emissive elements, in response to detecting the static mode.

In another example, this disclosure describes a device comprising means for detecting a static mode in an emissive display, means for mapping input signals to adjusted signals for a plurality of emissive elements of the emissive display based on magnitudes of the input signals, and means for applying the adjusted signals to selectively dim output of the plurality of emissive elements, in response to detecting the static mode.

The techniques described in this disclosure may be implemented at least partially in hardware, possibly using aspects of software or firmware in combination with the hardware. If implemented in software or firmware, the software or firmware may be executed in one or more hardware processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution by a processor cause the processor to detect a static mode in an emissive display, map input signals to adjusted signals for a plurality of emissive elements of the emissive display based on magnitudes of the input signals, and apply the adjusted signals to selectively dim output of the plurality of emissive elements, in response to detecting the static mode.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
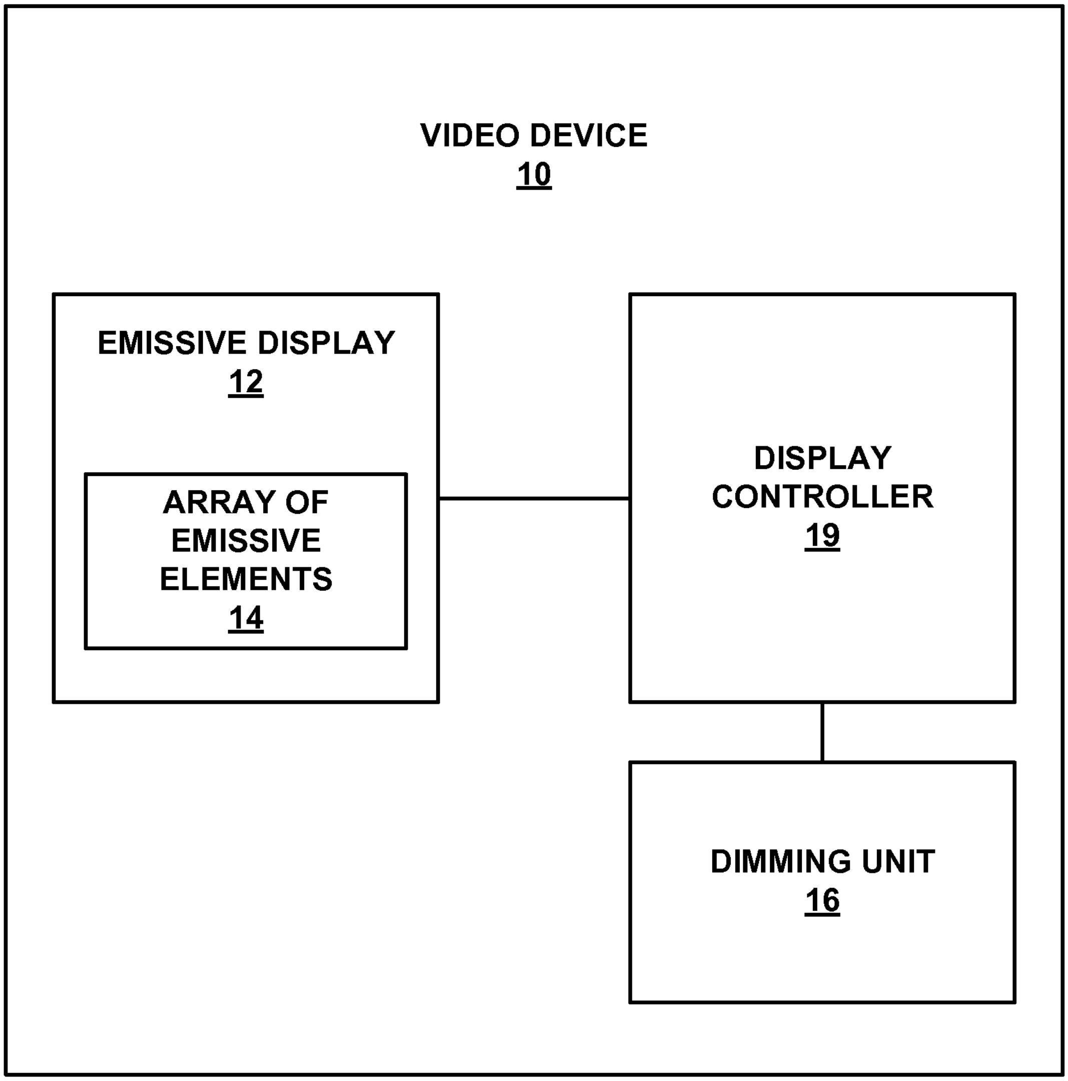
FIG. 1 is a block diagram illustrating an exemplary video device consistent with this disclosure.

This disclosure describes power saving techniques for emissive displays. In accordance with this disclosure, the outputs of emissive elements in an emissive display are selectively reduced in order to save power when the emissive display does not change its output imagery for a defined period. The techniques of this disclosure may achieve effects in emissive displays that appear visually similar to, or better than, the effects in conventional transmissive displays when the backlight dims over time.

Specifically, this disclosure provides for techniques that identify a static mode in an emissive display, and then map input values (e.g., gray level intensity values) to adjusted values (e.g., adjusted gray level intensity values). In order to identify the static mode, this disclosure may monitor components of a video device that can generate input values for the emissive display, such as a video decoder or a graphics processor. If the video decoder and/or the graphics processor have not generated any new input for the emissive display for a period of time, then the emissive display may be identified as being static, at which time, dimming may be performed. In some cases, several sequential static modes may be defined in order to dim the emissive display in stages over time.

In order to map input values to adjusted values, this disclosure provides for a number of different mapping techniques. The mapping of input values to adjusted values may be based on the magnitudes of the input values. The mappings may be non-linear, and therefore, input values may be mapped differently depending on the magnitudes of the input values. For example, in some cases, input values with larger magnitudes may be preserved more than input values with smaller magnitudes, which may achieve visually pleasing dimming results.

Thresholds may be defined for the input values, and the mapping that is applied to a given input value may depend on the magnitude of the given input value relative to the various thresholds. The thresholds may also be programmable in order to provide flexibility in the design and implementation of emissive displays. The mappings may be performed via table lookups or via the application of one or more equations.

The techniques of this disclosure may be useful for a wide range of emissive displays, including handheld devices that include emissive displays. Most conventional handheld devices use transmissive displays, which commonly include a backlight. In such devices, the backlight can be dimmed or turned off over in order to save battery power when the transmissive display is idle or when imagery does not change.

Emissive displays, such as plasma displays and organic light emitting diode (OLED) displays, are emerging as viable alternatives to transmissive displays. Emissive displays do not generally include a backlight. Instead, emissive displays include an array of emissive elements that are individually controlled in order to generate the desired rendition on the display. The emissive elements of emissive displays are generally analogous to individual light sources. Each pixel of an emissive display may be generated by controlling the output of one or more emissive elements of the emissive display.

The techniques of this disclosure may allow for the control of some or all of the emissive elements of an emissive display system in order to reduce the output intensities of the emissive elements upon identifying that the display output is static (e.g., the input to the display does not change) for a period of time. The techniques map input values to adjusted values, and in response to identifying a static mode of the emissive display, the techniques may drive the emissive elements of the emissive display with the adjusted values. In this way, visually pleasing dimming may be achieved and power savings can be promoted for emissive displays. The dimming may look similar to, or possibly better than, backlight dimming in transmissive display systems.

FIG. 1 is a block diagram illustrating an exemplary video device 10 consistent with this disclosure. Video device 10 includes an emissive display 12 comprising an array of emissive elements 14. The array of emissive elements 14 includes a plurality of emissive elements arranged in a two-dimensional (2D) array, where one or more of the emissive elements define pixels output by emissive display 12. Each pixel, for example, may be defined by a set of red (R) green (G) and blue (B) emissive elements, each of which may be controlled by monochromatic gray level intensity values. Other color combinations could also be used instead of RGB.

Video device 10 also includes a display controller 19 that receives input values and drives the array of emissive elements of emissive display 12 based on the input values. Display controller 19 may include a display buffer (not shown) that stores current input values for each element of array of emissive elements 14.

Video device 10 also includes dimming unit 16 that performs the techniques of this disclosure in order to map input values (e.g., gray level intensity values) to adjusted values (e.g., adjusted gray level intensity values) for each of a plurality of emissive elements in the array 14. In this way, dimming unit 16 may generate adjusted values for display controller 19 so that such adjusted values can be applied by display controller 19 in order to dim the array of emissive elements 14 of emissive display. Dimming unit 16 may include one or more lookup tables to perform the mappings described herein, or alternatively, dimming unit 16 may directly apply one or more equations to map input values to adjusted values.

Video device 10 may comprise a handheld device that includes emissive display 16, although this disclosure is not necessarily limited to handheld devices. In other examples, video device 10 may comprise a calculator, a cellular telephone, a smart phone, a personal digital assistant (PDA), a digital camera, a hand-held gaming device, a laptop computer, any other device that implements an emissive display.

Dimming unit 16 may comprise an integrated circuit, a microprocessor, a micro controller, discrete logic, or other components configured to perform the techniques of this disclosure. Dimming unit 16 may be implemented at least partially in hardware, and in some cases, may implement software or firmware in combination with the hardware. According to this disclosure, dimming unit 16 detects a static mode in emissive display 12, maps input signals to adjusted signals for the plurality of emissive elements in array 14 based on magnitudes of the input signals. For example, dimming unit 16 may apply one or more lookup tables or may apply one or more equations to facilitate the mappings.

Dimming unit 16 sends the adjusted values to display controller 19, which applies the adjusted signals to selectively dim output of the plurality of emissive elements, in response to detecting the static mode. The dimming is selective in the sense that different emissive elements are dimmed differently depending on the input magnitudes corresponding to those elements. As an example, input values with lower magnitudes may be dimmed more aggressively than input values with higher magnitudes such that the emissive elements associated with relatively higher value inputs are not dimmed as much as those emissive elements associated with relatively lower value inputs In detecting the static mode, dimming unit 16 may detect that the input signals to emissive display 16 have not changed for a period of time. As discussed in greater detail below, dimming unit 16 may detect the static mode by identifying inactivity in the graphics processor and/or a video decoder for the period of time. For example, the input signals may only change when certain components (such as a video decoder or a graphics processor) are active. Accordingly, dimming unit 16 may monitor such components, and may use the inactivity of such components as an indication for identifying the static mode of emissive display 12. In other cases, however, dimming unit 16 could monitor a display buffer of display controller to determine whether input data is changing, or could detect a static mode in another manner.

As described in greater detail below, dimming unit 16 may apply a non-linear mapping in order to map the input signals to the adjusted signals. The non-linear mapping may include two or more linear mappings separated by a saliency point. The different linear mappings may define different slopes above and below the saliency point such that the mappings are different for input magnitudes above the saliency point and input magnitudes below the saliency point.

In some cases, dimming unit 16 may apply multiple thresholds in order to determine the mappings, and the thresholds may be programmable values that can be programmed and possibly adjusted in dimming unit 16. For example, dimming unit 16 may apply a lower threshold T1 below which the input signals are mapped to adjusted signals of zero. In this case, if input signals define magnitudes below T1, the input signals may be mapped to adjusted values of zero. Dimming unit 16 may apply a first threshold range T1-T2 between which the input signals are mapped to first adjusted signals based on a first mapping, dimming unit 16 may also apply a second threshold range T2-T3 between which the input signals are mapped to second adjusted signals based on a second mapping, wherein the second mapping is different than the first mapping.

The threshold T2 may correspond to the saliency point. The first mapping may comprise a first linear mapping that defines a first linear slope, and the second mapping may comprise a second linear mapping that defines a second linear slope that is different than the first linear slope of the first linear mapping. Some or all of these variables applied by dimming unit 16 (such as T1, T2, T3, the first linear slope, and the second linear slope) may be programmable variables. Dimming unit 16 may receive information from a programmer, device manufacturer, or user that defines the programmable variables.

Dimming unit 16 may change emissive display 12 from a normal operation mode to a dimming mode in response to detecting the static mode of the emissive display 12. In the normal operation mode, the input signals are applied to emissive display 12 by display controller 19 in order to drive the plurality of emissive elements in array 14. However, in the dimming mode, dimming unit 16 may map the input signals to the adjusted signals, and supply the adjusted signals to display controller 19 so that the adjusted signals are applied by display controller 19 to drive the plurality of emissive elements in array 14.

In some cases, several tiers of static modes may be supported such that dimming unit 16 successively dims the output of emissive display 12 several times before eventually terminating any output by emissive display 12. Thus, the static mode may comprise a first static mode and the adjusted signals may comprise first adjusted signals. In this case, dimming unit 16 may detect a second static mode in emissive display 12, and re-map the input signal to second adjusted signals for the plurality of emissive elements of array 14 based on the magnitudes of the input signals. In this case, display controller 19 can apply the second adjusted signals to selectively dim output of the plurality of emissive elements, in response to detecting the second static mode. In this way, the dimming may occur in stages such that the output of emissive display 16 progressively dims more and more over time. At some point, the output of emissive display 12 may cease at the direction of dimming unit 16, if emissive display 12 remains static for a sufficiently long period of time.

Figure 2:
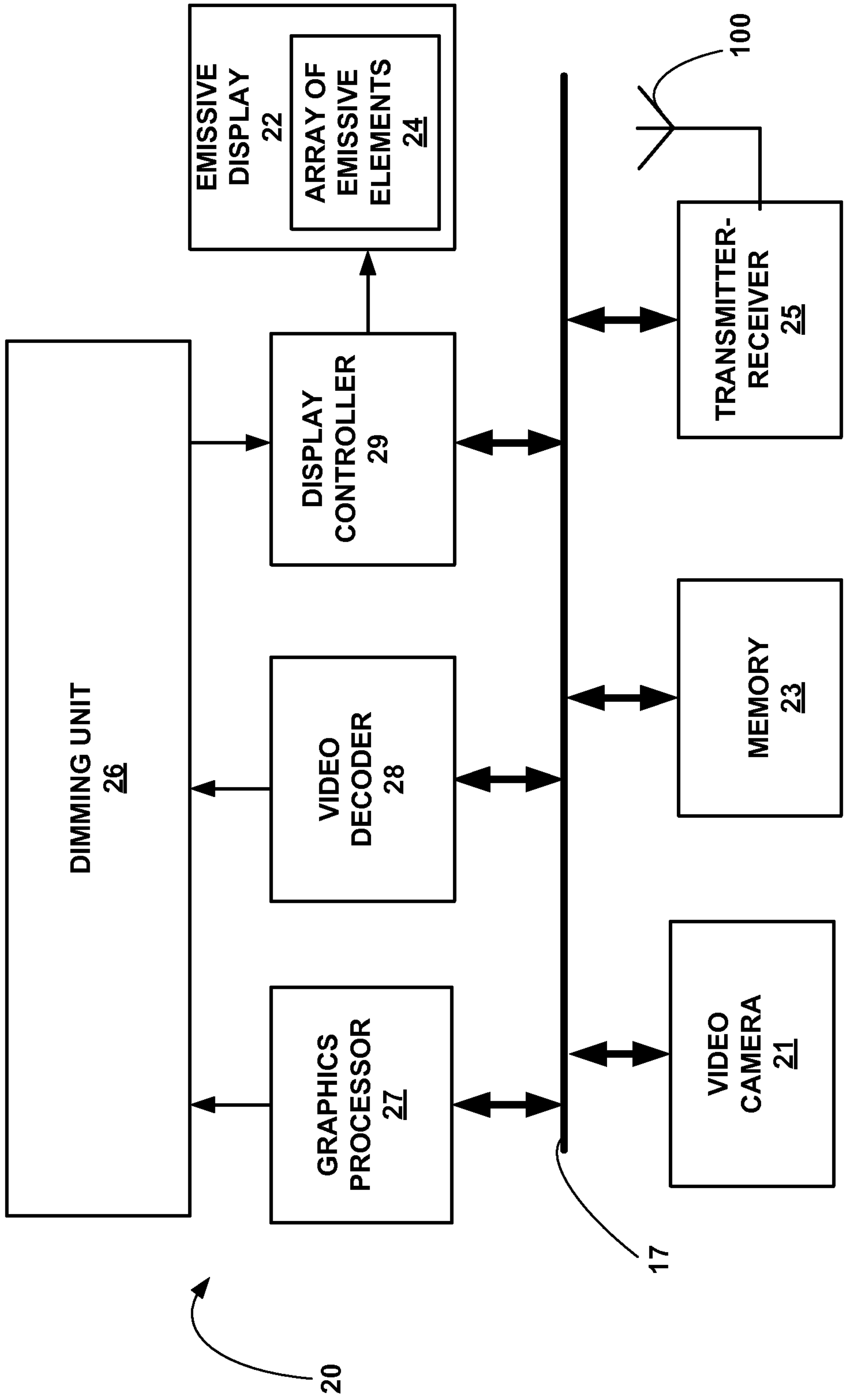
FIG. 2 is a more detailed block diagram illustrating an exemplary video device consistent with this disclosure.

FIG. 2 is a more detailed block diagram illustrating an exemplary video device 20 consistent with this disclosure. Device 20 comprises and emissive display 22 including an array of emissive elements 24. Display controller 29 generally controls emissive display 26. Dimming unit 26, however, may adjust the input that display controller 29 provides to emissive display as described herein. Video device 20 may correspond to a more specific example of video device 10, or may comprise a different video device than video device 10.

Device 20 may comprise a variety of other components, such as graphics processor 27, video decoder 28, video camera 21, memory 23, and transmitter-receiver 25. A system bus 17 may communicatively couple emissive display 22, graphics processor 27, video decoder 28, video camera 21, memory 23, and transmitter-receiver 25. Video camera 21 may capture video sequences, which may be stored in memory 23. Transmitter-receiver 25 may include a wireless antenna 100, and may allow for wireless communication with other devices. Accordingly, encoded video data may also be received at device 20 via transmitter-receiver 25. Transmitter-receiver 25 may operate according to any of a wide range of wireless protocols, such as code division multi access (CDMA) or other wireless protocols. Transmitter-receiver 25 may include a modem that modulates and demodulates data according to CDMA. Other exemplary wireless technologies that may be used by transmitter-receiver 25 may include the global system for mobile communications (GSM) system, frequency division multiple access (FDMA), time division multiple access (TDMA), orthogonal frequency division multi-access (OFDM), Bluetooth, one or more of the 802.11 protocols, wideband communication, or any other communication technique, standard or combinations thereof.

Device 20 also may also include a graphics processor 27 and a video decoder 28. Graphics processor 27 may perform graphics processing on video captured by video camera 21, and video decoder 28 may decode encoded video received by transmitter-receiver 25 or stored in memory 23. Accordingly, any video information to be displayed by emissive display 22 may first require processing by video decoder 28, graphics process 27, or possibly both. Therefore, in one aspect of this disclosure, dimming unit 26 may identify that both video decoder 28 and graphics process 27 have not generated any new input data, in order to identify or declare a static mode for emissive display 22.

According to this disclosure, dimming unit 26 detects a static mode in emissive display 22, and maps input signals to adjusted signals for the plurality of emissive elements in array 24 based on magnitudes of the input signals. Display controller 29 then applies the adjusted signals to selectively dim output of the plurality of emissive elements, in response to detecting the static mode. Again, in detecting the static mode, dimming unit 26 may detect that the input signals to emissive display 22 have not changed for a period of time, such as by monitoring the input signals to emissive display 22 or a display buffer, or by identifying inactivity in the graphics processor 27 and/or video decoder 28 for the period of time. A display buffer for emissive display 22 may be implemented within emissive display 22 or within display controller 29, and in some cases, display controller 29 can monitor input to the display buffer in order to detect the static state of emissive display 22. In this case, if data does not change in the display buffer for a defined period of time, then emissive display 22 may be in the static state. These or other techniques for detecting a static state of emissive display 22 may be used to determine whether dimming should occur.

Dimming unit 26 may apply a non-linear mapping in order to map the input signals to the adjusted signals. Dimming unit 26 may change emissive display 22 from a normal operation mode to a dimming mode in response to detecting the static mode of the emissive display 22. In the normal operation mode, the input signals are applied by emissive display 22 to drive the plurality of emissive elements in array 24. In this case, dimming unit 26 may simply pass any input signals directly to display controller 29 without performing any dimming (or alternatively, input signals could pass from graphics processor 27 or video decoder 28 directly to display controller 29 without passing through dimming unit 26). However, in the dimming mode, dimming unit 26 may map the input signals to the adjusted signals, and supply the adjusted signals to display controller 29 so that the adjusted signals are applied to drive the plurality of emissive elements in array 24.

Figure 3:
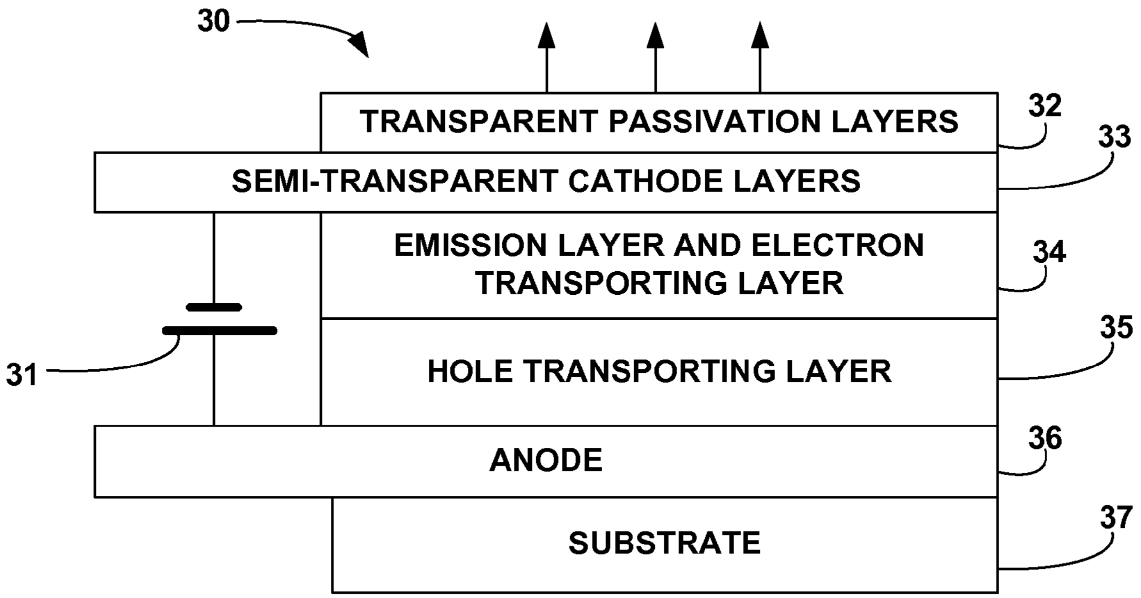
FIG. 3 is a conceptual diagram illustrating an exemplary emissive element of an emissive display.

FIG. 3 is a conceptual diagram illustrating an exemplary emissive element 30 of an emissive display. In this example, emissive element 30 comprises a substrate 37, an anode 36, a hole transporting layer 35, an emission layer and electron transporting layer 34, one or more semi-transparent cathode layers 33, and transparent passivation layers. Power source 31 provides a voltage across anode 36 and the one or more semi-transparent cathode layers 33. The voltage between anode 36 and transparent cathode layers 33 may be selected as an input signal to drive emissive element 30. The techniques of this disclosure provide for adjustment to the input signals for emissive elements (such as element 30) in order to achieve dimming effects. An emissive display may include a plurality of emissive elements, e.g., thousands or possibly millions of emissive elements like element 30, arranged in an array.

Figure 4:
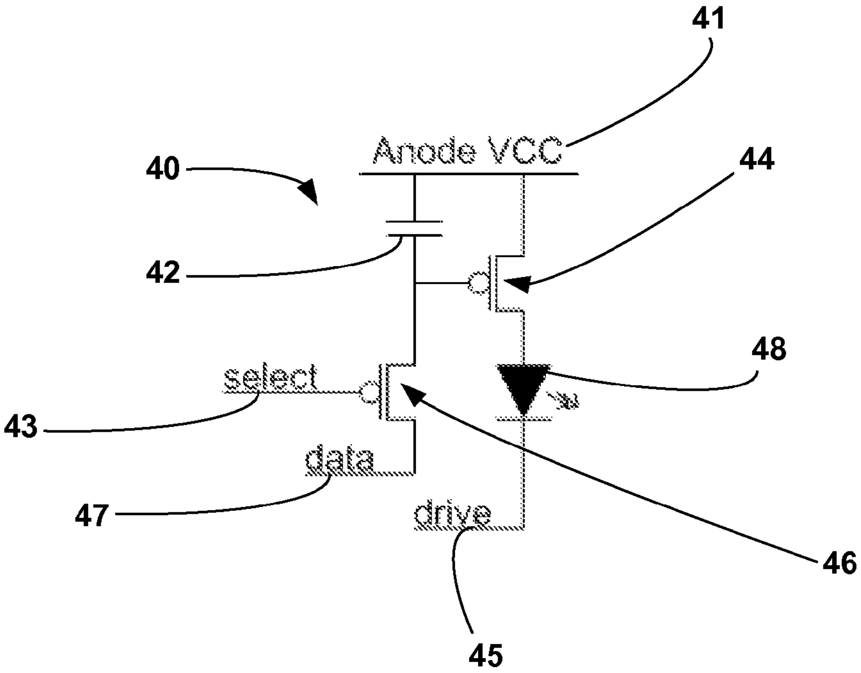
FIG. 4 is a circuit diagram illustrating an exemplary emissive element of an emissive display.

FIG. 4 is a circuit diagram illustrating an exemplary emissive element 40 of an emissive display. Anode VCC signal 41 defines an anode voltage and drive signal 45 defines the cathode voltage. Input data corresponds to data 47, and switching capacitor 46 controls (via select signal 43) whether such input data will cause charging to capacitor 42. Capacitor 42 operates as a temporary power source for controlling the gate of drive transistor 44, which in turn provides the voltage needed to drive light emitting diode (LED) 48. In this way, emissive element 40 can cause LED 48 to controllably emit light based on the input data signal 47.

Generally, in organic LEDs ("OLEDs"), an array of emissive elements may be arranged into a series of row and column lines to form pixels at the intersections of the rows and column lines. In so-called passive-matrix OLEDs, the desired image may be constantly scanned to refresh pixels and create desired illumination. In active-matrix OLEDs, every pixel may include a switch, a memory cell and a power source. When a row of pixels is addressed, the pixel switch may be turned on, transferring a charge that is proportional to the input signal from display drivers to a local pixel memory capacitor, such as capacitor 42. Capacitor 42 may retain charge until that same row is re-addressed in the next cycle, and thus, capacitor 42 operates as a short-term power source that drives the OLED pixel.

As mentioned, this disclosure describes power saving techniques for emissive displays that include a plurality of emissive elements (like element 30 or element 40 shown in FIGS. 3 and 4). Referring again to FIG. 2, dimming unit 26 may apply a non-linear mapping in order to map the input signals to the adjusted signals, wherein the adjusted signals dim the output of respective emissive elements relative to the original input signals. The non-linear mapping may include two or more linear mappings separated by a saliency point. The different linear mappings may define different slopes above and below the saliency point such that the mappings are different for input magnitudes above the saliency point and input magnitudes below the saliency point.

In some cases, dimming unit 26 may apply multiple thresholds in order to determine the mappings, and the thresholds may be programmable values that can be programmed and possibly adjusted in dimming unit. For example, dimming unit 26 may apply a lower threshold T1 below which the input signals are mapped to adjusted signals of zero. In this case, if input signals define magnitudes below T1, the input signals may be mapped to adjusted values of zero. Dimming unit 26 may apply a first threshold range T1-T2 between which the input signals are mapped to first adjusted signals based on a first mapping, dimming unit 26 may also apply a second threshold range T2-T3 between which the input signals are mapped to second adjusted signals based on a second mapping, wherein the second mapping is different than the first mapping.

The first mapping may comprise a first linear mapping that defines a first linear slope, and the second mapping may comprise a second linear mapping that defines a second linear slope that is different than the first linear slope of the first linear mapping. Some or all of these variables applied by dimming unit 26 (such as T1, T2, T3, the first linear slope and the second linear slope) may be programmable variables. Dimming unit 26 may receive information from a programmer or user that defines the programmable variables. Dimming unit 26 may include one or more lookup tables to facilitate the mappings. In this case, dimming unit may map input values to adjusted values by inputting the input values in the lookup tables(s), which map to corresponding adjusted values for a particular static mode. Alternatively or additionally, dimming unit 26 may input the input values into one or more equations in order to map the input values to corresponding adjusted values for a particular static mode.

Dimming unit 26 may change emissive display 22 from a normal operation mode to a dimming mode in response to detecting the static mode of the emissive display 22. In the normal operation mode, the input signals are applied by emissive display 22 to drive the plurality of emissive elements in array 24. However, in the dimming mode, dimming unit 26 may map the input signals to the adjusted signals, and supply the adjusted signals to emissive display 22 so that the adjusted signals are applied to drive the plurality of emissive elements in array 24. In some cases, a display buffer (not shown) in display controller 29 or emissive display 22 may be written with the original input signals and then overwritten with the adjusted signals when adjustment occurs. In other cases, a display buffer may be initially written with the signals to be displayed (either original or adjusted signals) depending on whether emissive display 22 is in the static mode.

In some cases, several tiers of static modes may be supported such that dimming unit 26 dims the output of emissive display 22 several times before eventually terminating any output by emissive display 22. Thus, the static mode may comprise a first static mode and the adjusted signals may comprise first adjusted signals. In this case, dimming unit 26 may detect a second static mode in emissive display 22, and re-map the input signal to second adjusted signals for the plurality of emissive elements of array 24 based on the magnitudes of the input signals. Accordingly, display controller 29 may receive and apply the second adjusted signals to selectively dim output of the plurality of emissive elements, in response to detection of the second static mode. In this way, the dimming may occur in stages such that the output of emissive display 26 dims more and more over time. At some point, the output of emissive display 22 may cease at the direction of dimming unit 26, if emissive display 22 remains static for a long enough period of time.

In FIG. 2, display controller 29 may comprise a standard controller for emissive display 22. In this case, dimming unit 26 may comprise a circuit or module that selectively adjusts input signals prior to delivering such signals to display controller 29. In other examples, however, the techniques and functionality of dimming unit 26 could be incorporated directly into display controller 29. In addition, in other examples, the techniques and functionality of dimming unit 26 could also be incorporated directly into graphics processor 27 and/or video decoder 28. The illustrations of this disclosure are merely exemplary, and other implementations could be used to achieve the same functionality described herein.

Figure 5:
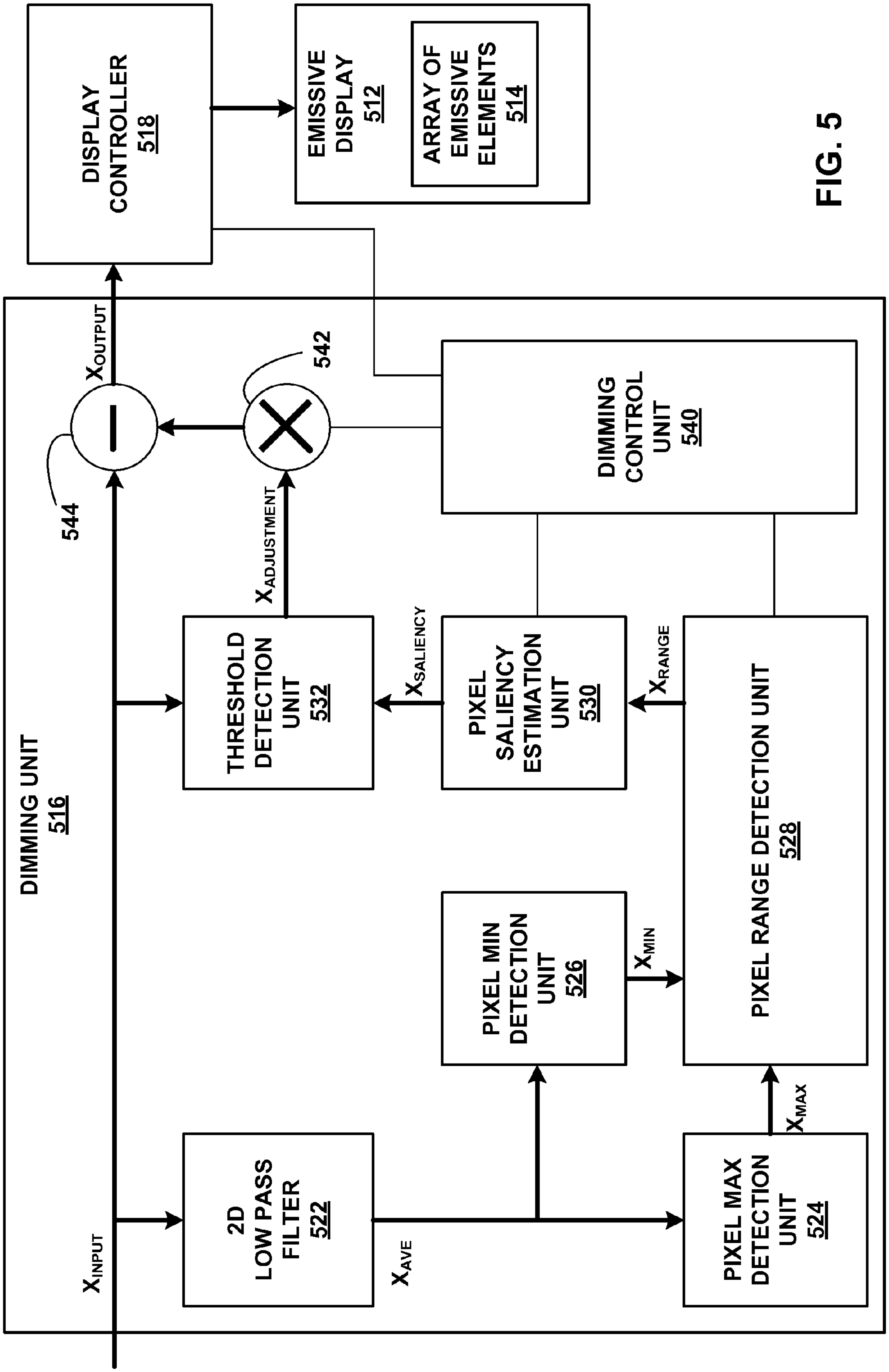
FIG. 5 is a block diagram of a dimming unit, a display controller and an emissive display, showing some exemplary details of the dimming unit.

FIG. 5 is a block diagram of a dimming unit 516, a display controller 518, and an emissive display 512 that includes an array of emissive elements 514. FIG. 5 specifically illustrates some exemplary details of one example of dimming unit 516. However, FIG. 5 is merely one example implementation of dimming unit 516, and other components or modules could be implemented to achieve similar functionality to that described herein.

Dimming unit 516 receives input data represented as $X_{INPUT}$. $X_{INPUT}$ may represent input signals (e.g., an input gray level intensity values) that would otherwise be used as input signals for the emissive elements in the array of emissive elements 514 of emissive display 512. However, dimming unit 516 may adjust $X_{INPUT}$ to adjusted signals (e.g., adjusted gray level intensity values), represented by $X_{OUTPUT}$. In this case, display controller 518 may apply $X_{OUTPUT}$ instead of $X_{INPUT}$ in order to drive the emissive elements in the array of emissive elements 514.

Dimming unit 516 may include a number of components designed to properly generate $X_{OUTPUT}$ based on $X_{INPUT}$. The values assigned to $X_{OUTPUT}$ may be based the magnitudes of $X_{INPUT}$. $X_{INPUT}$ may be filtered by a two-dimensional (2D) low pass filter 522 in order to generate an average value for the input, represented as $X_{AVE}$. The minimum and maximum values for the input may be determined from the $X_{AVE}$ by pixel minimum detection unit 526 and pixel maximum detection unit 524 respectively. The pixel minimum (i.e., the lightest gray scale value) is represented as $X_{MIN}$ and the pixel maximum (i.e., the darkest gray scale value) is represented as $X_{MAX}$. Pixel range detection unit 528 can use $X_{MIN}$ and $X_{MAX}$ to determine the pixel range, represented as $X_{RANGE}$.

Pixel saliency estimation unit 530 may estimate a saliency point within $X_{RANGE}$. The saliency point may be viewed as a threshold value that may be selectable or controllable, e.g., by the user of the device or possibly by the manufacturer of the device. Input values above the saliency point may be adjusted differently than input values below the saliency point. Dimming control unit 540 may control the various components, and may define or adjust the saliency point for different ranges of inputs. Dimming control unit 540 may also control multiplier 542 which may multiply an adjustment signal.

Threshold detection unit 532 may compare each incoming input value ($X_{INPUT}$) to the saliency point $X_{SALIENCY}$. Threshold detection unit 532 may generate an adjustment signal $X_{ADJUSTMENT}$ and this adjustment signal may differ depending on whether a given input value $X_{INPUT}$ is above or below the saliency point $X_{SALIENCY}$. Multiplier 542 may then multiply the adjustment signal $X_{ADJUSTMENT}$ by an amount directed by dimming control unit 540. This way, dimming control unit 540 may control multiplier 542 to sequentially increate the adjustments over time, and thereby reduce $X_{OUTPUT}$ over time when emissive display 512 remains static. The multiplied adjustment signal, which is output by multiplier 542, may be used by subtraction unit 544 to reduce $X_{INPUT}$ to $X_{OUTPUT}$. Thus, $X_{OUTPUT}$ can be provided as adjusted signals to display controller 518, which in turn drives the appropriate emissive elements of emissive display 512 based on $X_{OUTPUT}$. Since $X_{OUTPUT}$ is adjusted downward relative to $X_{INPUT}$, dimming is achieved.

Figure 6A:
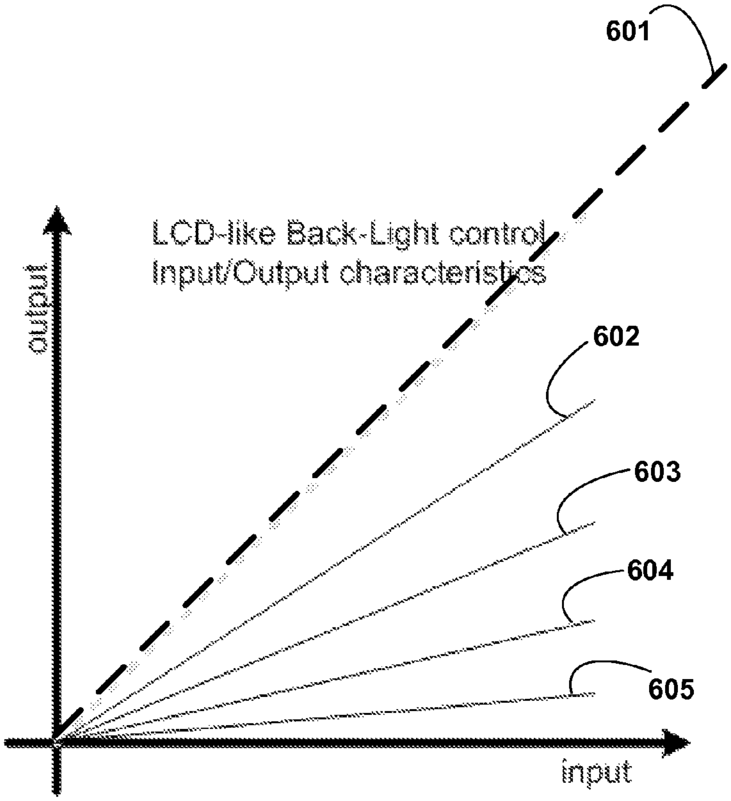
FIGS. 6A and 6B are graphs showing some exemplary mappings of input signals to output signals for an emissive display.
Figure 6B:
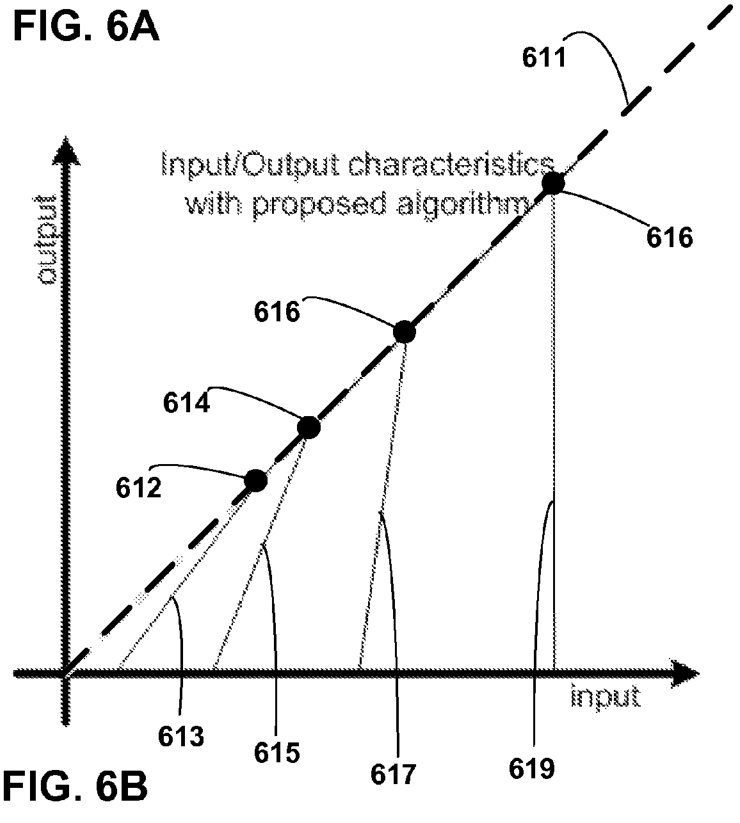

FIGS. 6A and 6B are graphs showing some exemplary mappings of input signals to output signals for an emissive display. These different mappings may be executed by a dimming unit, as described herein, to selectively define adjusted input signals for an emissive display based on the magnitude of the original input signals. The graphs of FIGS. 6A and 6B may represent input gray scale values ("input" along the X-axes) mapped to an adjusted gray scale values ("output" along the Y-axes).

In FIG. 6A, dimming occurs in a generally linear fashion. Line 601 represents the point where no changes occur. That is, along line 601, input values map 1-to-1 to corresponding output values. Lines 602, 603, 604 and 605 may represent different linear mappings that achieve dimming. In some cases, lines 602, 603, 604 and 605 may represent sequential dimming modes that achieve more and more dimming over time. Each of lines 602, 603, 604 and 605 may dim input values in a linear fashion. The example of FIG. 6A may achieve dimming in emissive displays that is similar to that of conventional backlight dimming in transmissive displays. The examples of FIG. 6B and FIGS. 7A-7F may further improve such dimming in emissive displays. The non-linear mapping examples of FIG. 6B and FIGS. 7A-7F may improve power In FIG. 6B, dimming occurs in a non-linear fashion. Line 611 represents the point where no changes occur. That is, along line 611, input values map 1-to-1 to corresponding output values. Points 612, 614, 616 and 618 represent different exemplary saliency points, e.g., associated with different dimming modes. Line 613 may correspond to a first dimming mode when the input is less than saliency point 612. In this case, if the input is greater than saliency point 612, the mapping is performed along line 611, such that dimming does not occur for those input values above saliency point 612.

Line 615 may correspond to a second dimming mode that is more aggressive than the first dimming mode. Along line 615, when the input is less than saliency point 614, dimming occurs, but if the input is greater than saliency point 614, the mapping is performed along line 611, such that dimming does not occur for those input values above saliency point 614.

Line 617 may correspond to a third dimming mode that is still more aggressive than the first and second dimming modes. Along line 617, when the input is less than saliency point 616, dimming occurs, but if the input is greater than saliency point 616, the mapping is performed along line 611, such that dimming does not occur for those input values above saliency point 614.

Line 619 may correspond to a fourth dimming mode that is still more aggressive than the first, second and third dimming modes. Along line 619, when the input is less than saliency point 618, the adjusted values are all mapped to zero, but if the input is greater than saliency point 618, the mapping is performed along line 611, such that dimming does not occur for those input values above saliency point 614. Each of the different lines illustrated in FIGS. 6A and 6B may be implemented using one or more lookup tables or one or more equations.

The different dimming modes may be used alternatively or successively. If used successively, dimming may occur according to the first dimming mode after the emissive display is static for time 1, and dimming may occur according to the second dimming mode after the emissive display is static for time 2 (wherein time 2>time 1). Similarly, dimming may occur according to the third dimming mode after the emissive display is static for time 3 (wherein time 3>time 2), and dimming may occur according to the forth dimming mode after the emissive display is static for time 4 (wherein time 4>time 3). As one non-limiting example time 1 may be approximately 5 seconds, time 2 may be approximately 10 seconds, time 3 may be approximately 15 seconds, and time 4 may be approximately 20 seconds. These times could be changed in different examples.

FIGS. 7A-7F are graphs showing some exemplary mappings of input signals to output signals for an emissive display. These different mappings may be applied alternatively or successively. Each of the different mappings illustrated in FIGS. 7A-7F may be implemented using one or more lookup tables or one or more equations. Different lookup tables or different equations, for example, may be applied depending on whether a given input magnitude resides above or below points (704, 714, 724, 734, 744 and 754) for a given mapping, where points (704, 714, 724, 734, 744 and 754) may represent saliency points as described herein.

The dimming becomes progressively more aggressive from FIG. 7A through FIG. 7F. Lines (702, 712, 722, 732, 742 and 752) represent the point at which no dimming occurs. Functions (701, 711, 721, 731, 741 and 751) represent exemplary non-linear mappings. Points (703, 713, 723, 733, 743 and 753) represent lower thresholds (each referred to as threshold T1) below which the input signals are mapped to adjusted signals of zero for each respective graph. Points (704, 714, 724, 734, 744 and 754) represent saliency points (each referred to as threshold T2). A first threshold range T1-T2 may define points at which the input signals are mapped to first adjusted signals based on a first mapping defined by the respective slopes between points (703, 713, 723, 733, 743 and 753) and points (704, 714, 724, 734, 744 and 754).

Points (705, 715, 725, 735, 745 and 755) represent high points (each referred to as threshold T3) which may correspond to maximum magnitudes of the input values. A second threshold range T2-T3 may define points at which the input signals are mapped to second adjusted signals based on a second mapping defined by the respective slopes between points (704, 714, 724, 734, 744 and 754) and points (705, 715, 725, 735, 745 and 755).

Figures 7A, 7B, 7C, 7D, 7E, 7F:
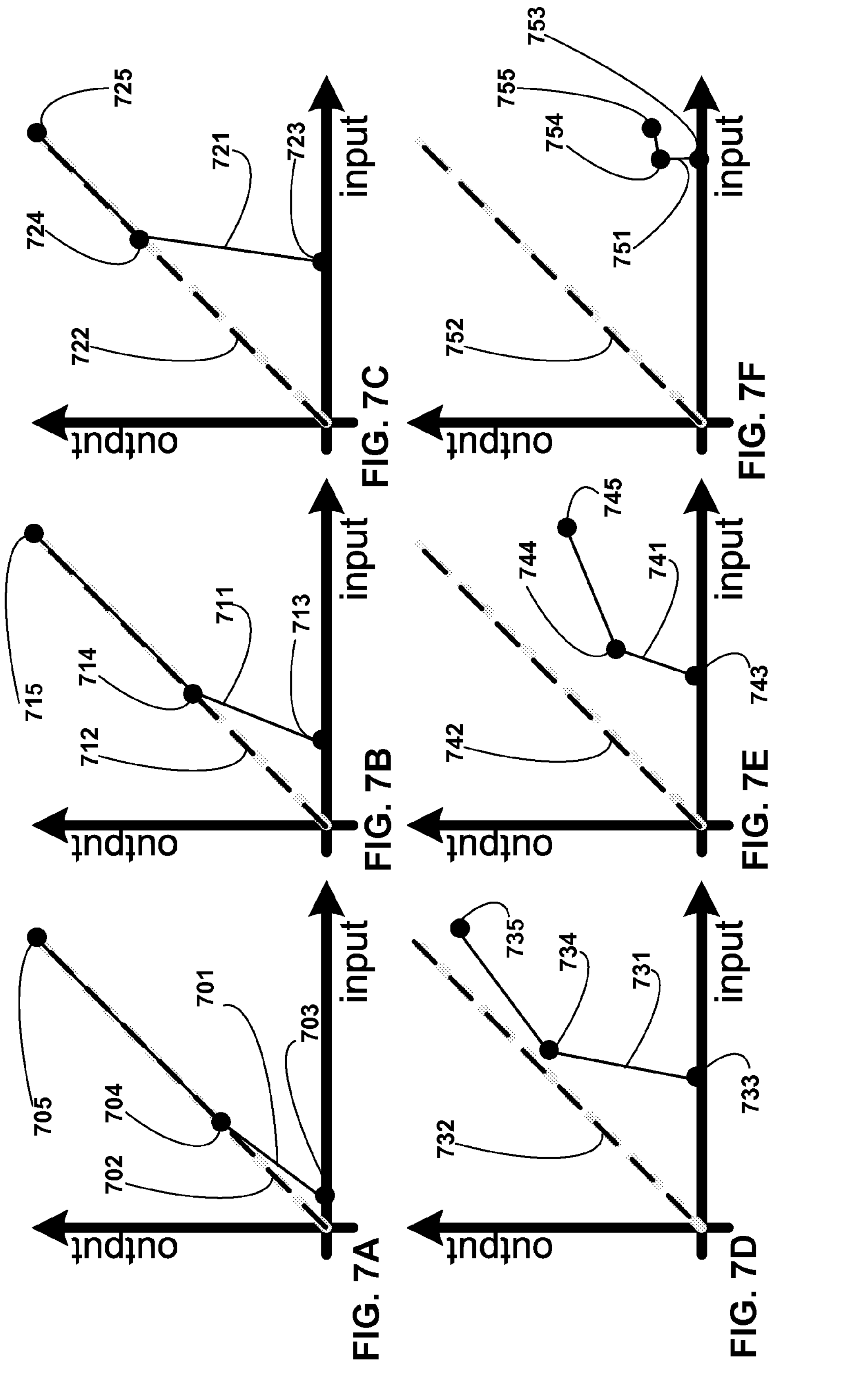
FIGS. 7A-7F are graphs showing some exemplary mappings of input signals to output signals for an emissive display.

If used successively, dimming may occur according to the first dimming mode defined by FIG. 7A after the emissive display is static for time 1, and dimming may occur according to the second dimming mode defined by FIG. 7B after the emissive display is static for time 2 (wherein time 2>time 1). Similarly, dimming may occur according to the third dimming mode defined by FIG. 7C after the emissive display is static for time 3 (wherein time 3>time 2), and dimming may occur according to the forth dimming mode defined by FIG. 7D after the emissive display is static for time 4 (wherein time 4>time 3). In addition, dimming may occur according to the fifth dimming mode defined by FIG. 7E after the emissive display is static for time 5 (wherein time 5>time 4), and dimming may occur according to the sixth dimming mode defined by FIG. 7F after the emissive display is static for time 6 (wherein time 6>time 5). Any number of dimming modes could be defined, and other types of mappings could be used consistent with this disclosure. As an example, time 1 may be approximately five seconds, and each successive time interval may be defined to be about five seconds longer than the previous time interval, although the time intervals may be defined in any manner.

Figure 8:
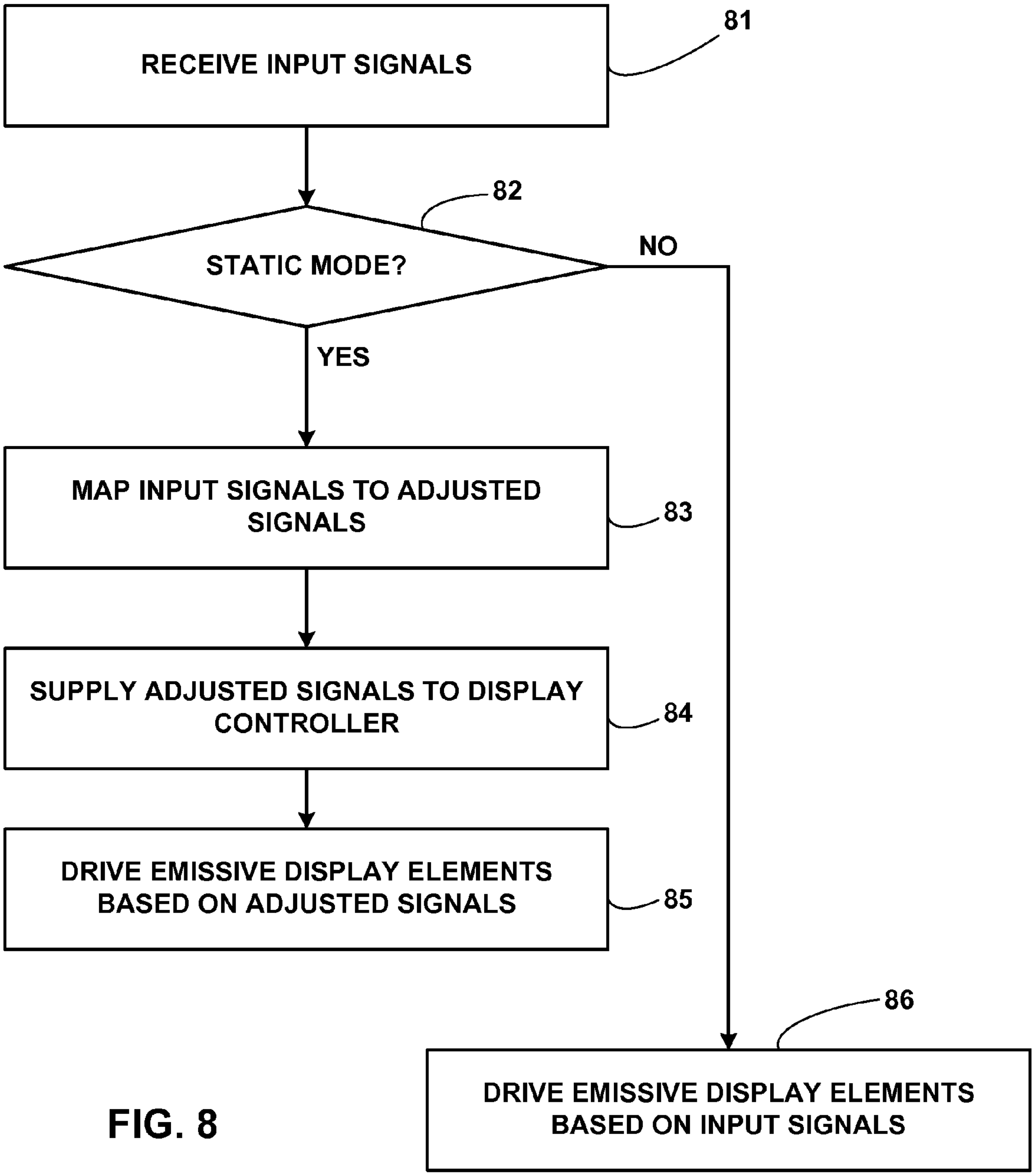
FIG. 8 is a flow diagram showing an exemplary technique for dimming the output of an emissive display.

FIG. 8 is a flow diagram illustrating a technique consistent with this disclosure. FIG. 8 will be described from the perspective of video device 20 of FIG. 2, although other devices could implement the technique. As shown in FIG. 8, dimming unit 26 receives input signals (81), e.g., from graphics processor 27 or video decoder 28. Dimming unit 26 then monitors for static mode (82), such as by determining whether new input values are received from graphics processor 27 or video decoder 28 or whether graphics processor 27 or video decoder 28 are inactive for a period of time.

In general, dimming unit 26 may detect the static mode by determining whether display content has changed or not. Dimming unit 26, for example, may include a timer (e.g., implemented in hardware) that is triggered by any write-access into any memory or buffer associated with emissive display 22. For example, if display controller 29 includes the display buffer for emissive display 22, dimming unit 26 may trigger its timer following a write-access to the display buffer by any component that can write to the buffer (such as graphics processor 27 or video decoder 28). Once the timer has elapsed a defined period of time, such as five seconds, this would indicate that the display content has not changed for this period of time. After this period of time, if there has been no write-access to the display buffer such that the display content has not changed, dimming unit 26 may declare or define the status of emissive display 22 as being static, and may begin the dimming techniques of this disclosure. Thereafter, if any write-access to the display buffer occurs, the static mode may be terminated by this write-access.

If static mode is not identified ("no" 82), dimming unit 26 does not perform any dimming and simply supplies the original input signals to display controller 29, which drives emissive elements within array 24 of emissive display 22 based on the original input signals (86). However, if the static mode is identified ("yes" 82), dimming unit 26 proceeds to map input signals to adjusted signals (83) based on the magnitudes of the input signals. Any of the graphs described herein could be used to define the mappings.

Dimming unit 26 supplies the adjusted signals to display controller 29 (84), and display controller 29 drives elements within array 24 of emissive display 22 based on the adjusted signals (85). In this way, dimming unit 26 can achieve dimming in emissive display 22 based on individual adjustments of the output of the individual elements in array 24. Any or all of the dimming unit 26, display controller 29 and emissive display 22 may include display buffers to temporarily store the data. In any case, the dimming may appear visually similar to, or possibly better than, dimming that occurs in transmissive displays due to reductions in backlight intensity.

Figure 9:
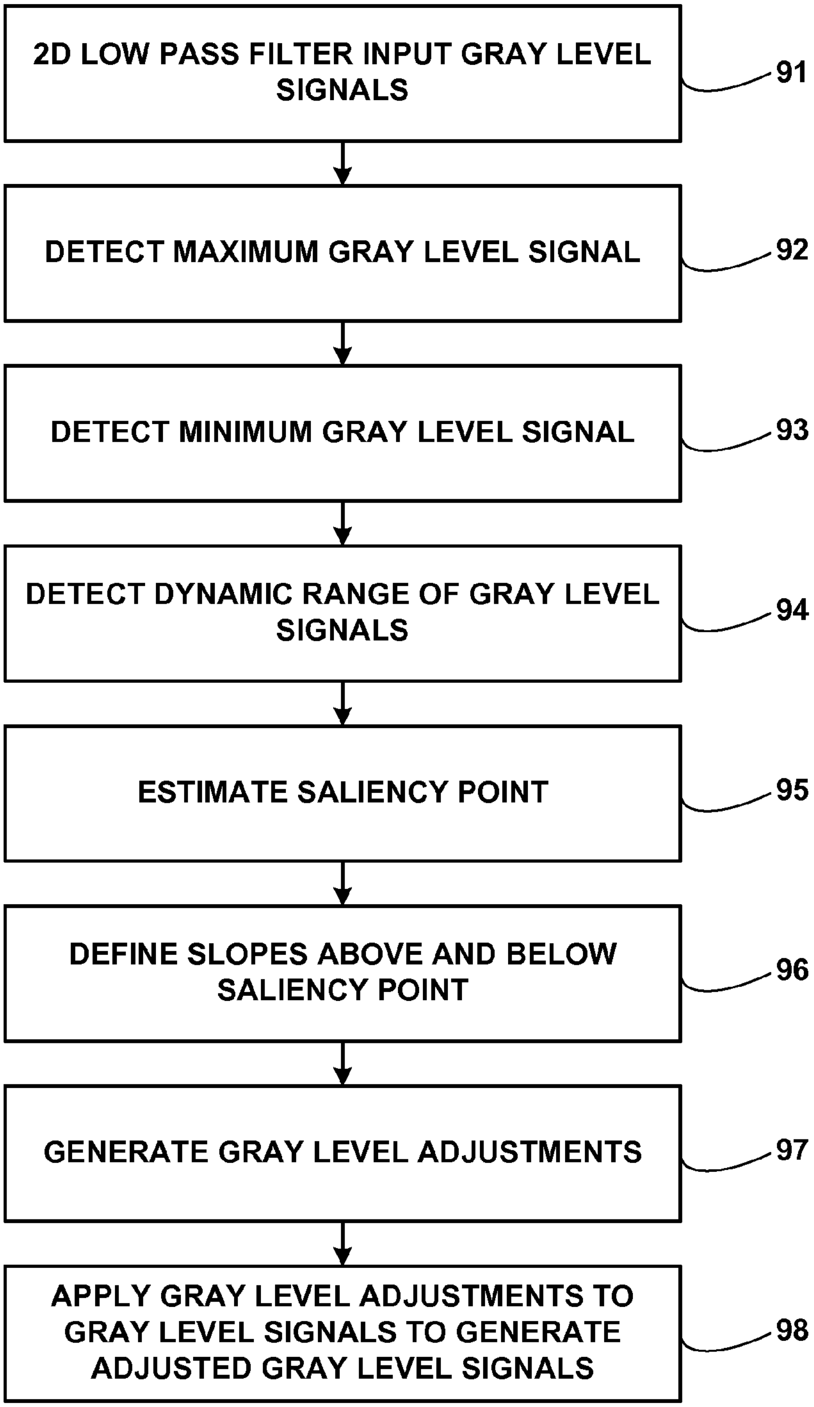
FIG. 9 is a flow diagram showing an exemplary technique for mapping input signals to adjusted signals in order to achieve dimming in an emissive display.

FIG. 9 is flow diagram showing an exemplary technique for mapping input signals to adjusted signals in order to achieve dimming in an emissive display. Other techniques for mapping input signals to adjusted signals could also be used in accordance with this disclosure. FIG. 9 outlines a mapping approach consistent with dimming unit 516 shown in FIG. 5. The various signals illustrated in FIG. 9 are typically digital values, although the bitwidths may vary.

As shown in FIG. 9, 2D low pass filter 522 filters input gray level signals $X_{INPUT}$ to generate the average signal $X_{AVE}$ for the input (91). Pixel max detection unit 524 detects the maximum gray level signal $X_{MAX}$ (92) and pixel min detection unit 526 detects the minimum gray level signal $X_{MIN}$ (93). Using these $X_{MAX}$ and $X_{MIN}$ values, pixel range detection unit 528 detects the dynamic range $X_{RANGE}$ of gray level signals (94). Dimming control unit 540 uses various programmable thresholds to control estimation of a saliency point, and the programmable thresholds may be programmed into pixel saliency estimation unit 530. Thus, pixel saliency estimation unit 530 may receive the dynamic range $X_{RANGE}$ and based on the dynamic range $X_{RANGE}$, pixel saliency estimation unit 530 can estimate the saliency point $X_{SALIENCY}$ within that dynamic range $X_{RANGE}$. Dimming control unit 540 may also define slopes above and below the saliency point $X_{SALIENCY}$ (96), and may control multiplier 542 to apply the slopes. Then, threshold detection unit 532 and multiplier 542 may generate gray level adjustments (97), which may comprise multiplied versions of $X_{ADJUSTMENT}$.

With regard to the pixel dynamic range $X_{RANGE}$ and the pixel saliency point $X_{SALIENCY}$, intuitively, the maximum picture dynamic range may be construed as the raw display panel brightness without any compensation for ambient light of the viewing environment. Many mobile handset displays may provide contrast ratios of approximately 1000:1 CR with approximately 400 nits (candela per square meter) (cd/m2) full-brightness, which can be supported by a 10-12 bit picture luminance in the display data. However, actual dynamic range may also depend on panel brightness, and picture saliency may also depend on picture content. For example, a picture of a snowy mountain range at full-brightness may have saliency point at approximately 100 nits without minimizing picture resolution. Therefore, picture dynamic-range and its saliency point are proposed to be programmable and determined by dimming unit 516 or another type of display processor using the techniques of this disclosure.

For example, threshold detection unit 532 may detect whether $X_{INPUT}$ is above or below one or more thresholds, and may generate $X_{ADJUSTMENT}$ based on the value of) $X_{INPUT}$ relative to such thresholds. $X_{ADJUSTMENT}$ may then be multiplied by multiplier 542, and the multiplication factor may differ depending on whether $X_{INPUT}$ is above or below the saliency point $X_{SALIENCY}$. The multiplied adjustments may be applied to the input gray level signals $X_{INPUT}$ by subtraction unit 544 in order to generate the adjusted gray level signals $X_{OUTPUT}$ (98). In this way, the signals received by display controller 518 and used to drive the array of emissive elements of emissive display 512 may comprise adjusted gray level signals $X_{OUTPUT}$ that were adjusted based on the magnitudes of the input gray level signals $X_{INPUT}$ and other factors such as the programmable thresholds applied by dimming control unit 540 to define the saliency point and the slopes for mapping signals above and below the saliency point.

Figure 10:
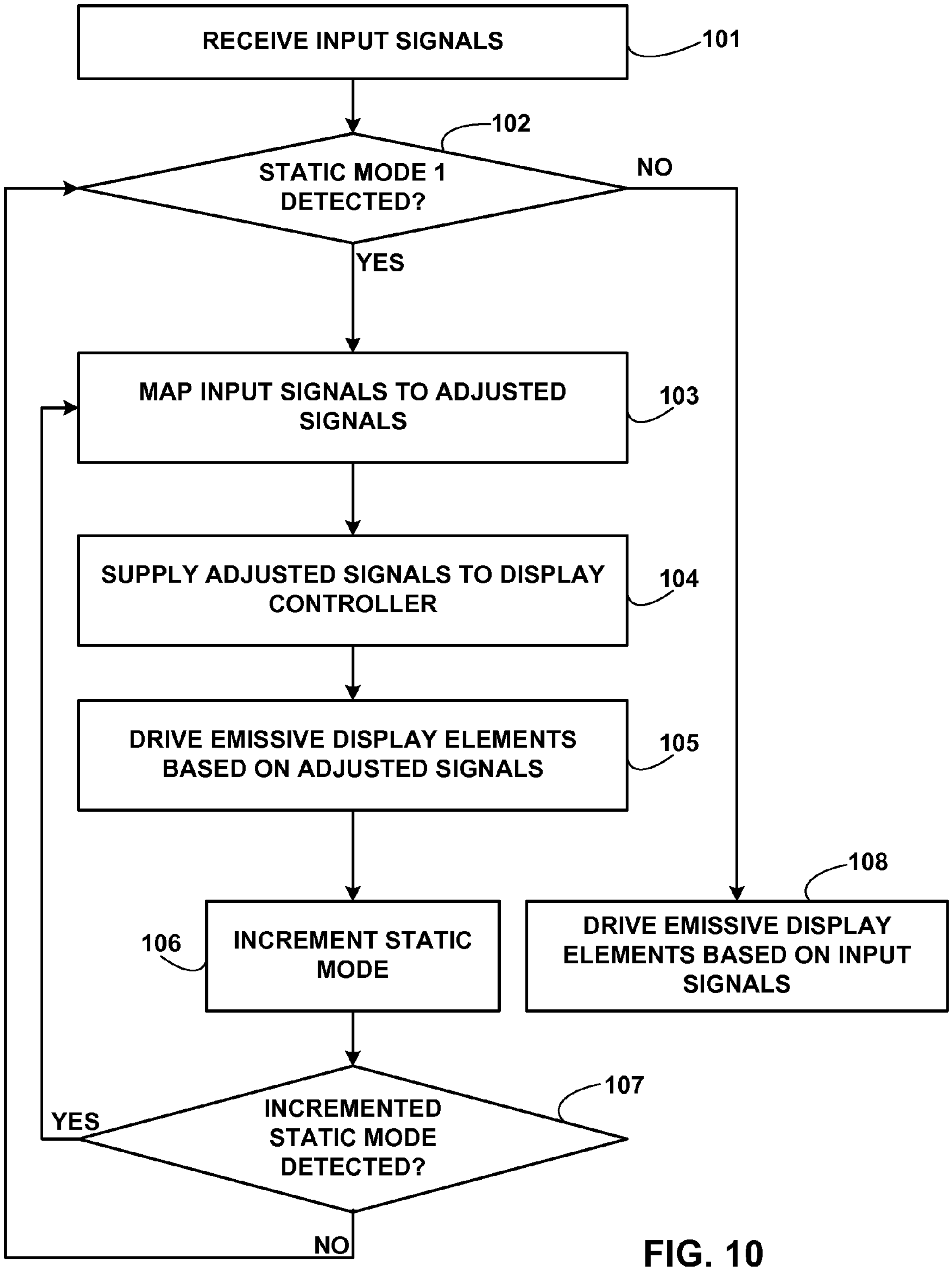
FIG. 10 is a flow diagram showing an exemplary technique for incrementally and successively dimming the output of an emissive display.

FIG. 10 is a flow diagram showing an exemplary technique for incrementally and successively dimming the output of an emissive display. FIG. 10 is similar to FIG. 8, but includes an additional loop for successively determining successive static modes, and thus, successively dimming the output of an emissive display. FIG. 10 will be described from the perspective of video device 20 of FIG. 2, although other devices could implement the technique. As shown in FIG. 10, dimming unit 26 receives input signals (101), e.g., from graphics processor 27 or video decoder 28. Dimming unit 26 then monitors for static mode (102), such as by determining whether new input values are received from graphics processor 27 or video decoder 28 or whether graphics processor 27 or video decoder 28 are inactive for a period of time.

If static mode is not identified ("no" 102), dimming unit 26 does not perform any dimming and simply supplies the original input signals to display controller 29, which drives emissive elements within array 24 of emissive display 22 based on the original input signals (108). However, if the static mode is identified ("yes" 102), dimming unit 26 proceeds to map input signals to adjusted signals (103) based on the magnitudes of the input signals. Any of the graphs described herein could be used to define the mappings.

Dimming unit 26 supplies the adjusted signals to display controller 29 (104), and display controller 29 drives elements within array 24 of emissive display 22 based on the adjusted signals (105). In this way, dimming unit 26 can achieve dimming in emissive display 22 based on individual adjustments of the output of the individual elements in array 24.

Once a first static mode has been identified, according to FIG. 10, dimming unit 26 may increment the static mode (106), and then monitor for the incremented static mode (107). With the detection of each successive static mode ("yes" (107), dimming unit 26 may re-map input signals to adjusted signals (103) based on the magnitudes of the input signals, and supply the adjusted signals to display controller 29 (104). Display controller 29 then drives elements within array 24 of emissive display 22 based on the adjusted signals (105). In this way, dimming unit 26 can achieve progressive dimming in emissive display 22 based on individual adjustments of the output of the individual elements in array 24.

The progressive stages of dimming may become more and more aggressive in terms of the level of dimming. FIG. 6A provides one example, where lines 602, 603, 604, and 604 provide linear mappings that become progressively more aggressive in terms of the level of dimming. FIG. 6B provides another example, where each line (613, 615, 617 and 619) along with each saliency point (612, 614, 616 and 618) and line 611 provide non-linear mappings that become progressively more aggressive in terms of the level of dimming. In addition, as explained above, FIGS. 7A-7F illustrate yet another example where each respective graph provides non-linear mappings that become progressively more aggressive in terms of the level of dimming. These or other types of mappings could be used consistent with this disclosure.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various examples have been described in this disclosure. These and other examples are within the scope of the following claims.

The invention claimed is:

1. A method comprising:

detecting a first static mode in an emissive display when no new input has been generated for the emissive display for a first period of time;

in response to detecting the first static mode, non-linearly mapping input signals to first adjusted signals for a plurality of emissive elements of the emissive display, by at least:

mapping input signals with magnitudes less than a first threshold to the first adjusted signals with zero magnitude;

mapping input signals with magnitudes between the first threshold and a second threshold to the first adjusted signals based on a first mapping; and mapping input signals with magnitudes greater than the second threshold to the first adjusted signals based on a second mapping, wherein the second threshold is greater than the first threshold;

in response to detecting the first static mode, applying the first adjusted signals to selectively dim output of the plurality of emissive elements such that emissive elements of the plurality of emissive elements associated with the input signals with magnitudes higher than the second threshold are not dimmed as much as emissive elements of the plurality of emissive elements associated with the input signals with magnitudes between than the first threshold and the second threshold;

detecting a second static mode in the emissive display when no new input has been generated for the emissive display for a second period of time that is longer than the first period of time;

in response to detecting the second static mode, non-linearly re-mapping the input signals to second adjusted signals for the plurality of emissive elements of the emissive display, wherein non-linearly re-mapping comprises:

mapping input signals with magnitudes less than a third threshold to the second adjusted signals with zero magnitude, wherein the third threshold is greater than the first threshold;

mapping input signals with magnitudes between the third threshold and a fourth threshold to the second adjusted signals based on a third mapping; and mapping input signals with magnitudes greater than the fourth threshold to the second adjusted signals based on a fourth mapping; and in response to detecting the second static mode, applying the second adjusted signals to selectively dim output of the plurality of emissive elements such that emissive elements of the plurality of emissive elements associated with the input signals with magnitudes higher than the fourth threshold are not dimmed as much as emissive elements of the plurality of emissive elements associated with the input signals with magnitudes between than the third threshold and the fourth threshold;

detecting a final static mode in the emissive display when no new input has been generated for the emissive display for a final period of time that is longer than the second period of time;

in response to detecting the final static mode, mapping the input signals to final adjusted signals with zero magnitude; and in response to detecting the final static mode, applying the final adjusted signals to selectively dim output of the plurality of emissive elements.

2. The method of claim 1, wherein detecting the first static mode comprises identifying that a graphics processor has not generated any new input signals for the first period of time.

3. The method of claim 1, wherein detecting the first static mode comprises identifying that a video decoder has not generated any new input signals for the first period of time.

4. The method of claim 1, wherein detecting the first static mode comprises identifying that a video decoder and a graphics processor have not generated any new input signals for the first period of time.

5. The method of claim 1, wherein the first mapping comprises a first linear mapping that defines a first linear slope, and wherein the second mapping comprises a second linear mapping that defines a second linear slope that is different than the first linear slope of the first linear mapping.

6. The method of claim 5, wherein the first linear slope and the second linear slope are programmable variables.

7. The method of claim 1, further comprising changing from a normal operation mode of the emissive display to a dimming mode of the emissive display in response to detecting the first static mode of the emissive display, wherein in the normal operation mode, the input signals are applied to drive the plurality of emissive elements and wherein in the dimming mode, the input signals are mapped to the adjusted signals and the adjusted signals are applied to drive for the plurality of emissive elements.

8. The method of claim 1, wherein the fourth threshold is greater than the second threshold.

9. The method of claim 1, wherein the fourth mapping is the same as the second mapping.

10. The method of claim 1, further comprising:

determining the first threshold based on the input signals.

11. An apparatus comprising:

an emissive display including a plurality of emissive elements;

a display controller configured to drive the plurality of emissive elements; and a dimming unit configured to:

detect a first static mode in the emissive display when no new input has been generated for the emissive display for a first period of time;

responsive to detecting the first static mode, non-linearly map input signals to first adjusted signals for the plurality of emissive elements of the emissive display by at least mapping input signals with magnitudes less than a first threshold to the first adjusted signals with zero magnitude, mapping input signals with magnitudes between the first threshold and a second threshold to the first adjusted signals based on a first mapping, and mapping input signals with magnitudes greater than the second threshold to the first adjusted signals based on a second mapping, wherein the second threshold is greater than the first threshold;

responsive to detecting the first static mode, apply the first adjusted signals to selectively dim output of the plurality of emissive elements such that emissive elements of the plurality of emissive elements associated with the input signals with magnitudes higher than the second threshold are not dimmed as much as emissive elements of the plurality of emissive elements associated with the input signals with magnitudes between the first threshold and the second threshold;

detect a second static mode in the emissive display when no new input has been generated for the emissive display for a second period of time that is longer than the first period of time;

responsive to detecting the second static mode, non-linearly re-map the input signals to second adjusted signals for the plurality of emissive elements of the emissive display by at least mapping input signals with magnitudes less than a third threshold to the second adjusted signals with zero magnitude, wherein the third threshold is greater than the first threshold, mapping input signals with magnitudes between the third threshold and a fourth threshold to the second adjusted signals based on a third mapping, and mapping input signals with magnitudes greater than the fourth threshold to the second adjusted signals based on a fourth mapping;

responsive to detecting the second static mode, apply the second adjusted signals to selectively dim output of the plurality of emissive elements such that emissive elements of the plurality of emissive elements associated with the input signals with magnitudes higher than the fourth threshold are not dimmed as much as emissive elements of the plurality of emissive elements associated with the input signals with magnitudes between than the third threshold and the fourth threshold;

detect a final static mode in the emissive display when no new input has been generated for the emissive display for a final period of time that is longer than the second period of time;

responsive to detecting the final static mode, map the input signals to final adjusted signals with zero magnitude; and responsive to detecting the final static mode, apply the final adjusted signals to selectively dim output of the plurality of emissive elements.

12. The apparatus of claim 11, the apparatus further comprising a graphics processor configured to generate the input signals, wherein in detecting the first static mode the dimming unit is configured to identify that the graphics processor has not generated any new input signals for the first period of time.

13. The apparatus of claim 11, the apparatus further comprising a video decoder configured to generate the input signals, wherein in detecting the first static mode the dimming unit is configured to identify that the video decoder has not generated any new input signals for the first period of time.

14. The apparatus of claim 11, the apparatus further comprising a graphics processor and a video decoder that are each configured to generate the input signals, wherein, in detecting the first static mode the dimming unit is configured to identify that the graphics processor and the video decoder have not generated any new input signals for the first period of time.

15. The apparatus of claim 11, wherein the first mapping comprises a first linear mapping that defines a first linear slope, and wherein the second mapping comprises a second linear mapping that defines a second linear slope that is different than the first linear slope of the first linear mapping.

16. The apparatus of claim 15, wherein the first linear slope and the second linear slope are programmable variables.

17. The apparatus of claim 11, wherein the dimming unit comprises one of an integrated circuit and a microprocessor.

18. The apparatus of claim 11, wherein the apparatus comprises a handheld device that includes the emissive display.

19. The apparatus of claim 11, wherein the dimming unit is configured to change the emissive display from a normal operation mode of the emissive display to a dimming mode of the emissive display in response to detecting the first static mode of the emissive display, wherein in the normal operation mode, the input signals are applied to drive the plurality of emissive elements and wherein in the dimming mode, the input signals are mapped to the adjusted signals and the adjusted signals are applied to drive for the plurality of emissive elements.

20. The apparatus of claim 11, wherein the fourth threshold is greater than the second threshold.

21. The apparatus of claim 11, wherein the fourth mapping is the same as the second mapping.

22. The apparatus of claim 11, wherein dimming unit is further configured to:

determine the first threshold based on the input signals.

23. A device comprising:

means for detecting a first static mode in an emissive display when no new input has been generated for the emissive display for a first period of time;

means for non-linearly mapping input signals to first adjusted signals for a plurality of emissive elements of the emissive display responsive to detecting the first static mode, wherein the means for non-linearly mapping the input signals to the first adjusted signals comprise:

means for mapping input signals with magnitudes less than a first threshold to the first adjusted signals with zero magnitude;

means for mapping input signals with magnitudes between the first threshold and a second threshold to the first adjusted signals based on a first mapping; and means for mapping input signals with magnitudes greater than the second threshold to the first adjusted signals based on a second mapping, wherein the second threshold is greater than the first threshold;

means for applying, responsive to detecting the first static mode, the first adjusted signals to selectively dim output of the plurality of emissive elements such that emissive elements of the plurality of emissive elements associated with the input signals with magnitudes higher than the second threshold are not dimmed as much as emissive elements of the plurality of emissive elements associated with the input signals with magnitudes between than the first threshold and the second threshold;

means for detecting a second static mode in the emissive display when no new input has been generated for the emissive display for a second period of time that is longer than the first period of time;

means for non-linearly re-mapping the input signals to second adjusted signals for the plurality of emissive elements of the emissive display responsive to detecting the second static mode, wherein the means for non-linearly re-mapping the input signals to the second adjusted signals comprise:

means for mapping input signals with magnitudes less than a third threshold to the second adjusted signals with zero magnitude, wherein the third threshold is greater than the first threshold;

means for mapping input signals with magnitudes between the third threshold and a fourth threshold to the second adjusted signals based on a third mapping; and means for mapping input signals with magnitudes greater than the fourth threshold to the second adjusted signals based on a fourth mapping;

means for applying, responsive to detecting the second static mode, the second adjusted signals to selectively dim output of the plurality of emissive elements such that emissive elements of the plurality of emissive elements associated with the input signals with magnitudes higher than the fourth threshold are not dimmed as much as emissive elements of the plurality of emissive elements associated with the input signals with magnitudes between than the third threshold and the fourth threshold;

means for detecting a final static mode in the emissive display when no new input has been generated for the emissive display for a final period of time that is longer than the second period of time;

means for mapping the input signals to final adjusted signals with zero magnitude responsive to detecting the final static mode; and means for applying the final adjusted signals to selectively dim output of the plurality of emissive elements responsive to detecting the final static mode.

24. The device of claim 23, wherein means for detecting the first static mode comprises means for identifying that a graphics processor has not generated any new input signals for the first period of time.

25. The device of claim 23, wherein means for detecting the first static mode comprises means for identifying that a video decoder has not generated any new input signals for the first period of time.

26. The device of claim 23, wherein means for detecting the first static mode comprises means for identifying that a video decoder and a graphics processor have not generated any new input signals for the first period of time.

27. The device of claim 23, wherein the first mapping comprises a first linear mapping that defines a first linear slope, and wherein the second mapping comprises a second linear mapping that defines a second linear slope that is different than the first linear slope of the first linear mapping.

28. The device of claim 27, wherein the first linear slope and the second linear slope are programmable variables.

29. The device of claim 23, the device further comprising means for changing from a normal operation mode of the emissive display to a dimming mode of the emissive display in response to detecting the first static mode of the emissive display, wherein in the normal operation mode, the input signals are applied to drive the plurality of emissive elements and wherein in the dimming mode, the input signals are mapped to the adjusted signals and the adjusted signals are applied to drive for the plurality of emissive elements.

30. The device of claim 23, wherein the fourth threshold is greater than the second threshold.

31. The device of claim 23, wherein the fourth mapping is the same as the second mapping.

32. The device of claim 23, further comprising:

means for determining the first threshold based on the input signals.

33. A non-transitory computer-readable storage medium comprising instructions that upon execution by a processor cause the processor to:

detect a first static mode in an emissive display when no new input has been generated for the emissive display for a first period of time;

in response to detecting the static mode, non-linearly map input signals to first adjusted signals for a plurality of emissive elements of the emissive display by at least:

mapping input signals with magnitudes less than a first threshold to the first adjusted signals with zero magnitude;

mapping input signals with magnitudes between the first threshold and a second threshold to the first adjusted signals based on a first mapping; and mapping input signals with magnitudes greater than the second threshold to the first adjusted signals based on a second mapping, wherein the second threshold is greater than the first threshold;

in response to detecting the first static mode, apply the first adjusted signals to selectively dim output of the plurality of emissive elements such that emissive elements of the plurality of emissive elements associated with the input signals with magnitudes higher than the second threshold are not dimmed as much as emissive elements of the plurality of emissive elements associated with the input signals with magnitudes between than the first threshold and the second threshold;

detect a second static mode in the emissive display when no new input has been generated for the emissive display for a second period of time that is longer than the first period of time;

in response to detecting the second static mode, non-linearly re-map the input signals to second adjusted signals for the plurality of emissive elements of the emissive display by at least:

mapping input signals with magnitudes less than a third threshold to the second adjusted signals with zero magnitude, wherein the third threshold is greater than the first threshold;

mapping input signals with magnitudes between the third threshold and a fourth threshold to the second adjusted signals based on a third mapping; and mapping input signals with magnitudes greater than the fourth threshold to the second adjusted signals based on a fourth mapping;

in response to detecting the second static mode, apply the second adjusted signals to selectively dim output of the plurality of emissive elements such that emissive elements of the plurality of emissive elements associated with the input signals with magnitudes higher than the fourth threshold are not dimmed as much as emissive elements of the plurality of emissive elements associated with the input signals with magnitudes between than the third threshold and the fourth threshold;

detect a final static mode in the emissive display when no new input has been generated for the emissive display for a final period of time that is longer than the second period of time;

in response to detecting the final static mode, map the input signals to final adjusted signals with zero magnitude; and in response to detecting the final static mode, apply the final adjusted signals to selectively dim output of the plurality of emissive elements.

34. The non-transitory computer-readable storage medium of claim 33, wherein in detecting the first static mode, the instructions cause the processor to identify that a graphics processor has not generated any new input signals for the first period of time.

35. The non-transitory computer-readable storage medium of claim 33, wherein in detecting the first static mode, the instructions cause the processor to identify that a video decoder has not generated any new input signals for the first period of time.

36. The non-transitory computer-readable storage medium of claim 33, wherein in detecting the first static mode, the instructions cause the processor to identify that a video decoder and a graphics processor have not generated any new input signals for the first period of time.

37. The non-transitory computer-readable storage medium of claim 33, wherein the first mapping comprises a first linear mapping that defines a first linear slope, and wherein the second mapping comprises a second linear mapping that defines a second linear slope that is different than the first linear slope of the first linear mapping.

38. The non-transitory computer-readable storage medium of claim 37, wherein the first linear slope and the second linear slope are programmable variables.

39. The non-transitory computer-readable storage medium of claim 33, further comprising instructions that cause the processor to change from a normal operation mode of the emissive display to a dimming mode of the emissive display in response to detecting the first static mode of the emissive display, wherein in the normal operation mode, the input signals are applied to drive the plurality of emissive elements and wherein in the dimming mode, the input signals are mapped to the adjusted signals and the adjusted signals are applied to drive for the plurality of emissive elements.

40. The non-transitory computer-readable storage medium of claim 33, wherein the fourth threshold is greater than the second threshold.

41. The non-transitory computer-readable storage medium of claim 33, wherein the fourth mapping is the same as the second mapping.

42. The non-transitory computer-readable storage medium of claim 33, further comprising instructions that upon execution by the processor cause the processor to:

determine the first threshold based on the input signals.

* * * * *